(12) United States Patent
Övgård

(10) Patent No.: US 10,589,614 B2
(45) Date of Patent: Mar. 17, 2020

(54) REINFORCEMENT STRUCTURE

(71) Applicant: Volvo Car Corporation, Göteborg (SE)

(72) Inventor: Fredrik Övgård, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/233,591

(22) Filed: Dec. 27, 2018

(65) Prior Publication Data

US 2019/0210441 A1 Jul. 11, 2019

(30) Foreign Application Priority Data

Jan. 10, 2018 (EP) ..................................... 18150934

(51) Int. Cl.

| | |
|---|---|
| *B62D 21/00* | (2006.01) |
| *B60K 1/04* | (2019.01) |
| *B62D 21/10* | (2006.01) |
| *B62D 25/20* | (2006.01) |
| *B62D 21/02* | (2006.01) |

(Continued)

(52) U.S. Cl.
CPC ................ *B60K 1/04* (2013.01); *B60L 50/64* (2019.02); *B60L 50/66* (2019.02); *B62D 21/02* (2013.01); *B62D 21/10* (2013.01); *B62D 21/15* (2013.01); *B62D 25/20* (2013.01); *B60K 2001/0438* (2013.01); *B60Y 2306/01* (2013.01)

(58) Field of Classification Search
CPC ... B60K 1/04; B60K 2001/0438; B60L 50/64; B60L 50/66; B62D 21/02; B62D 21/10; B62D 21/15
See application file for complete search history.

(56) References Cited

U.S. PATENT DOCUMENTS

| 5,558,949 A | * | 9/1996 | Iwatsuki | ............. | H01M 2/1083 |
| | | | | | 180/68.5 |
| 6,227,322 B1 | * | 5/2001 | Nishikawa | .............. | B60R 16/04 |
| | | | | | 180/65.1 |

(Continued)

FOREIGN PATENT DOCUMENTS

| DE | 202016100631 U1 | 3/2016 |
| EP | 2910394 A1 | 8/2015 |

(Continued)

OTHER PUBLICATIONS

Jun. 26, 2018 European Search Report issue on International Application No. EP18150934.

*Primary Examiner* — Hau V Phan
(74) *Attorney, Agent, or Firm* — Clements Bernard Walker; Christopher L. Bernard

(57) ABSTRACT

A reinforcement structure for protection of a vehicle power source, e.g. a battery pack or a fuel cell. The reinforcement structure extends in a first, a second and a third direction ($D_1$, $D_2$, $D_3$) being perpendicular to each other, wherein an extension of the reinforcement structure is at least 5 times larger in the first and second directions than in the third direction. The reinforcement structure has a tapered shape as seen in a plane spanned by the first and second directions. The present disclosure also relates to a reinforcement unit, a vehicle power source arrangement and a vehicle utilizing such reinforcement structure.

15 Claims, 6 Drawing Sheets

(51) Int. Cl.
  B60L 50/64 (2019.01)
  B62D 21/15 (2006.01)
  B60L 50/60 (2019.01)

(56) References Cited

U.S. PATENT DOCUMENTS

| | | | | |
|---|---|---|---|---|
| 7,618,087 | B2 * | 11/2009 | Hedderly | B62D 25/16 |
| | | | | 296/193.09 |
| 8,540,282 | B2 * | 9/2013 | Yoda | B60K 1/04 |
| | | | | 280/784 |
| 8,833,839 | B2 * | 9/2014 | Young | B62D 21/157 |
| | | | | 296/187.12 |
| 9,045,030 | B2 * | 6/2015 | Rawlinson | B60K 1/04 |
| 9,755,262 | B2 * | 9/2017 | Ikeda | B60L 50/72 |
| 9,862,427 | B2 * | 1/2018 | Berger | B62D 25/20 |
| 9,956,859 | B2 * | 5/2018 | Ikeda | B60K 1/04 |
| 2008/0173489 | A1 * | 7/2008 | Takasaki | B60K 1/04 |
| | | | | 180/68.5 |
| 2008/0283318 | A1 | 11/2008 | Wagner et al. | |
| 2010/0289295 | A1 * | 11/2010 | Yoda | B60K 1/04 |
| | | | | 296/187.03 |
| 2012/0156539 | A1 * | 6/2012 | Honjo | B60K 1/04 |
| | | | | 429/100 |
| 2017/0057556 | A1 | 3/2017 | Vollmer | |
| 2017/0088178 | A1 | 3/2017 | Tsukada et al. | |
| 2017/0120951 | A1 * | 5/2017 | Ashraf | B62D 21/03 |
| 2017/0182873 | A1 | 6/2017 | Baccouche et al. | |
| 2017/0240207 | A1 | 8/2017 | Kido et al. | |
| 2018/0126857 | A1 * | 5/2018 | Kelly-Morgan | C08L 33/06 |
| 2018/0287227 | A1 * | 10/2018 | Jeong | B60L 58/25 |

FOREIGN PATENT DOCUMENTS

| | | |
|---|---|---|
| GB | 2482172 A | 1/2012 |
| WO | 2012091404 A2 | 1/2012 |

* cited by examiner

REINFORCEMENT STRUCTURE

CROSS-REFERENCE TO RELATED APPLICATION

The present patent application/patent claims the benefit of priority of co-pending European Patent Application No. 18150934.0, filed on Jan. 10, 2018, and entitled "REINFORCEMENT STRUCTURE," the contents of which are incorporated in full by reference herein.

TECHNICAL FIELD

The present disclosure relates to a reinforcement structure for protection of a vehicle power source, e.g. a battery pack or a fuel cell. The present disclosure also relates to a reinforcement unit, a vehicle power source arrangement and a vehicle.

BACKGROUND

A vehicle, such as an electric vehicle or a hybrid vehicle, is provided with a vehicle power source of another kind than a combustion engine, e.g. a vehicle battery pack or a fuel cell. It is then usually necessary to protect the vehicle power source from an impact, e.g. if the vehicle is involved in a collision.

Patent document US 2017/0240207 A1 discloses a protective frame structure for a battery including a lower frame, an intermediate frame and an upper frame. The battery is located between the lower frame and the intermediate frame. An upper space is formed between the intermediate frame and the upper frame. When an external load is applied to the frame structure, the intermediate frame is deformed upwards.

Patent document DE 20 2016 100 631 A1 discloses a housing for a vehicle battery of a vehicle. The housing comprises: a plurality of side walls, a top wall and a bottom wall. Each of the walls includes a plurality of parallel T-shaped guides. The T-shaped guides on the top wall and the bottom wall extend horizontally, and the T-shaped guides on some of the side walls extend vertically. A plurality of elongated fastening elements is mounted between the T-shaped guides. In an exemplified embodiment, the fastening elements have a half-cylindrical shock-absorbing profiling.

However, there is a desire to further improve the protection of the vehicle power source. It is then desired to provide a protection, which is able to take up load, but which yet only adds a low weight and which does not build too much height.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, according to the present invention there is provided a reinforcement structure for protection of a vehicle power source, e.g. a battery pack or a fuel cell. The reinforcement structure extends in a first, a second and a third direction being perpendicular to each other, wherein an extension of the reinforcement structure is at least 5 times larger in the first and second directions than in the third direction. The reinforcement structure has a tapered shape as seen in a plane spanned by the first and second directions.

The reinforcement structure thereby has a substantially two-dimensional extension, i.e. its length and width are much larger than its height. The length and width, i.e. the extension in the first and second directions, are at least 5 times larger, preferably at least 10 times larger, more preferably at least 20 times larger than the height, the extension in the third direction.

The directions of the reinforcement structure correspond to the directions of the vehicle in which the reinforcement structure is intended to be mounted. The first direction thereby corresponds to a longitudinal direction of the vehicle, the second direction to a lateral direction of the vehicle and the third direction to a height direction of the vehicle, assuming the vehicle is standing on a plane ground.

The shape of the reinforcement structure is tapered as seen in a plane spanned by the first and second directions, i.e. when the three-dimensional shape of the reinforcement structure is projected to the plane spanned by the first and second directions and thus forms a two-dimensional shape on this plane.

The vehicle power source may be at least partly surrounded by, and/or protected by, a housing comprising one or more of a bottom wall, configured to carry the vehicle power source, a top lid, configured to cover and thereby seal the vehicle power source from above, a front wall, a rear wall, a first lateral wall and a second lateral wall, configured to protect the sides of the vehicle power source. There may be one or more cross members located inside the vehicle power source, or along the front and rear sides of the vehicle power source, which cross members extend in the lateral direction of the vehicle. Typically, the lateral walls and/or the cross members are extruded, such that their cross-sections comprise internal cells and/or internal walls.

In case of a side impact, e.g. side collision with a pole, the reinforcement structure is able to redistribute a load being applied to the vehicle from the side of the vehicle. Load can be redistributed from the lateral wall closest to the side impact to the one or more cross members and/or to the bottom wall. There will then be load paths both below the vehicle power source, e.g. along the bottom wall of the vehicle power source, and above the vehicle power source, e.g. along the top lid reinforced by one or more reinforcement structures according to the invention. This will contribute to prevent the lateral wall from tilting, which is a risk in prior art solutions without the reinforcement structures. As a result, there will be less intrusion in the vehicle power source due to the side impact as compared to prior art solutions. The influence on the vehicle power source will thus be accordingly less.

The reinforcement structure as described herein may also be positioned in the vehicle in such way that the reinforcement structure helps to protect the vehicle power source in a frontal impact or a rear impact involving the vehicle. In that case, the first direction corresponds to the lateral direction of the vehicle, the second direction to the longitudinal direction of the vehicle and the third direction to a height direction of the vehicle, assuming the vehicle is standing on a plane ground.

Hence, according to the invention, there is provided a vehicle power source protection, which is able to take up load, but which yet only adds a low weight and which does not build too much height.

The tapered shape may be continuously decreasing, preferably regularly continuously decreasing. The shape may be triangular, preferably having a shape of a right-angled triangle. In that case, the two shorter sides of the triangle preferably coincide with the first and second directions of the reinforcement structure.

A maximum extension of the reinforcement structure in the first direction, corresponding to a width of the reinforcement structure and typically intended to be in the longitudinal direction of the vehicle, may be in the range of 5-50 cm, preferably 5-40 cm, more preferably 10-30 cm, and most preferably 15-25 cm.

A maximum extension of the reinforcement structure in the second direction, corresponding to a length of the reinforcement structure and typically intended to be in the lateral direction of the vehicle, may be in the range of 20-150 cm, preferably 25-125 cm, more preferably 30-100 cm, most preferably 40-70 cm.

A maximum extension c of the reinforcement structure in the third direction, corresponding to a height of the reinforcement structure and intended to be in the height direction of the vehicle, may be in the range of $0<c\leq5$ cm, preferably $0.3\leq c\leq3$ cm, more preferably $0.5\leq c\leq2$ cm, most preferably $0.8\leq c\leq1.5$ cm. However, as mentioned above, the length and width are at least 5 times larger, preferably at least 10 times larger, and more preferably at least 20 times larger than the height.

The reinforcement structure may comprise, or be constituted by, a shaped sheet metal. The sheet metal is thereby shaped, e.g. by forming depressions in it, such that it comprises at least one valley, and preferably comprises a plurality of ridges being interspaced by valleys. In that case, the ridges and valleys preferably extend in parallel and equidistantly. There may be from 2 to 10 valleys, preferably from 2 to 8 valleys, more preferably from 2 to 5 valleys, most preferably from 2 to 4 valleys.

The reinforcement structure may have a shape of a right-angled triangle with the ridges and valleys being parallel to the longest side of the triangle. The top angle of the triangle may be in the range of 5-75 degrees, preferably 10-60 degrees, more preferably 15-50 degrees.

The valley may have a bottom width in the range of 0.2-10 cm, preferably 0.5-8 cm, more preferably 1-5 cm, most preferably 1-3 cm. The bottom of the valley is preferably flat in order to be suitable for welding to the top lid, which covers the vehicle power source in order to seal it from above. The bottom width of the valley may be adapted to the size of a welding tool. A number of attachments, e.g. spot welds, may be utilized to attach the reinforcement structure to the top lid, e.g. with a distance in the ranges of 10-40 mm between the spot welds. As an alternative or a complement to the welds, the valleys may be continuously attached to the top lid, e.g. by means of an adhesive.

The width of the valleys is determined as the narrowest width. The width is thus typically determined in a direction being perpendicular to the extension direction of the valley.

The c-c distance between two adjacent valleys may be in the range of 0.4-20 cm, preferably 1-16 cm, more preferably 2-10 cm, most preferably 4-8 cm. The distance is determined as a centre to centre distance between two adjacent valleys.

Typically, the reinforcement structure is attached to one of the lateral walls, e.g. by means of adhesive and/or bolts, such as bolts of M8 size. If the reinforcement structure has a triangular shape, it is typically attached along a first side of the triangle.

Further, the reinforcement structure is typically attached to one of the cross members, e.g. by means of adhesive and/or bolts, such as bolts of M8 size. If the reinforcement structure has a triangular shape, it is typically attached along a second side of the triangle. In that case, a right angle I typically formed between the first and second sides of the triangle.

The present invention also relates to a reinforcement unit comprising a plurality, such as two, three, four, six, eight, or more, reinforcement structures as described herein. Preferably, the plurality of reinforcement structures are arranged such that a first reinforcement structure forms a mirror image of an adjacent second reinforcement structure, as seen in the plane spanned by the first and second directions.

If more than two reinforcement structures are included in the reinforcement unit, they may pairwise form mirror-images of each other. It has been found beneficial to form two such adjacent reinforcement structures as a common unit from a piece of sheet metal. The two adjacent reinforcement structures then together form the reinforcement unit. As an alternative, more than two reinforcement structures, such as three, four, six, eight, or more reinforcement structures, may be formed as a common reinforcement unit. It could for example be beneficial to form all reinforcement structures at the same side of the vehicle as a common reinforcement unit. It would also be possible to form all reinforcement structures as a common reinforcement unit.

The present invention further relates to a vehicle power source arrangement comprising a vehicle power source, e.g. a battery pack or a fuel cell, and at least one of the reinforcement structures or reinforcement units as described herein, preferably a plurality of the reinforcement structures or a plurality of reinforcement units as described herein.

The vehicle power source arrangement may comprise the top lid as described herein, which is configured to cover and thereby seal the vehicle power source from above. The at least one reinforcement structure or reinforcement unit is intended to be located at the top lid, preferably on top of the top lid. Further, the at least one reinforcement structure or reinforcement unit is preferably attached to the top lid, e.g. by means of spot welding or projection welding. In projection welding, the weld is localized by means of raised sections, also called projections, on one or both of the reinforcement structure and the top lid. Current is then concentrated at the projections thereby providing the weld.

As an option, the top lid may be shaped such that it comprises a number of protrusions, preferably located at the locations, in which the reinforcement structure is attached to the top lid, e.g. at the spot welds. These protrusions are quite small, e.g. having a diameter less than 20 mm or less than 15 mm. Thereby, the reinforcement structure is in physical contact with the top lid at those protrusions and there is no physical contact, or substantially no physical contact, outside the protrusions. This will help to reduce the risk of trapping moisture between the reinforcement structure and the top lid, which moisture could risk leading to corrosion.

The vehicle power source arrangement may comprise the bottom wall as described herein, which is configured to carry the vehicle power source. The at least one reinforcement structure or reinforcement unit may then be located at the bottom wall, at its upper side or lower side, preferably being attached to the bottom wall, e.g. by means of spot welding or projection welding.

In case the vehicle power source arrangement comprises at least one lateral wall extending along a lateral side of the vehicle power source and at least one cross member extending across the vehicle power source or along a front side or a rear side thereof, the reinforcement structure may comprise, or be constituted by at least one strut extending between the cross member and the lateral wall, preferably a plurality of struts extending between the cross member and the lateral wall, more preferably the struts extending in parallel between the cross member and the lateral wall.

The struts then form an alternative or a complement to the above-mentioned shaped sheet metal. The struts and their interspaces may correspond to the ridges and valleys described herein, e.g. such that the struts extend in parallel to the longest side of the above-mentioned triangle shape. The struts themselves could in that case be attached to the top lid. There may be from 1 to 10 struts, preferably from 2 to 8, more preferably from 2 to 5, most preferably from 2 to 4, e.g. extending in parallel.

The present invention as well relates to a vehicle comprising the reinforcement structure, the reinforcement unit and/or the vehicle power source arrangement as described herein.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 1:
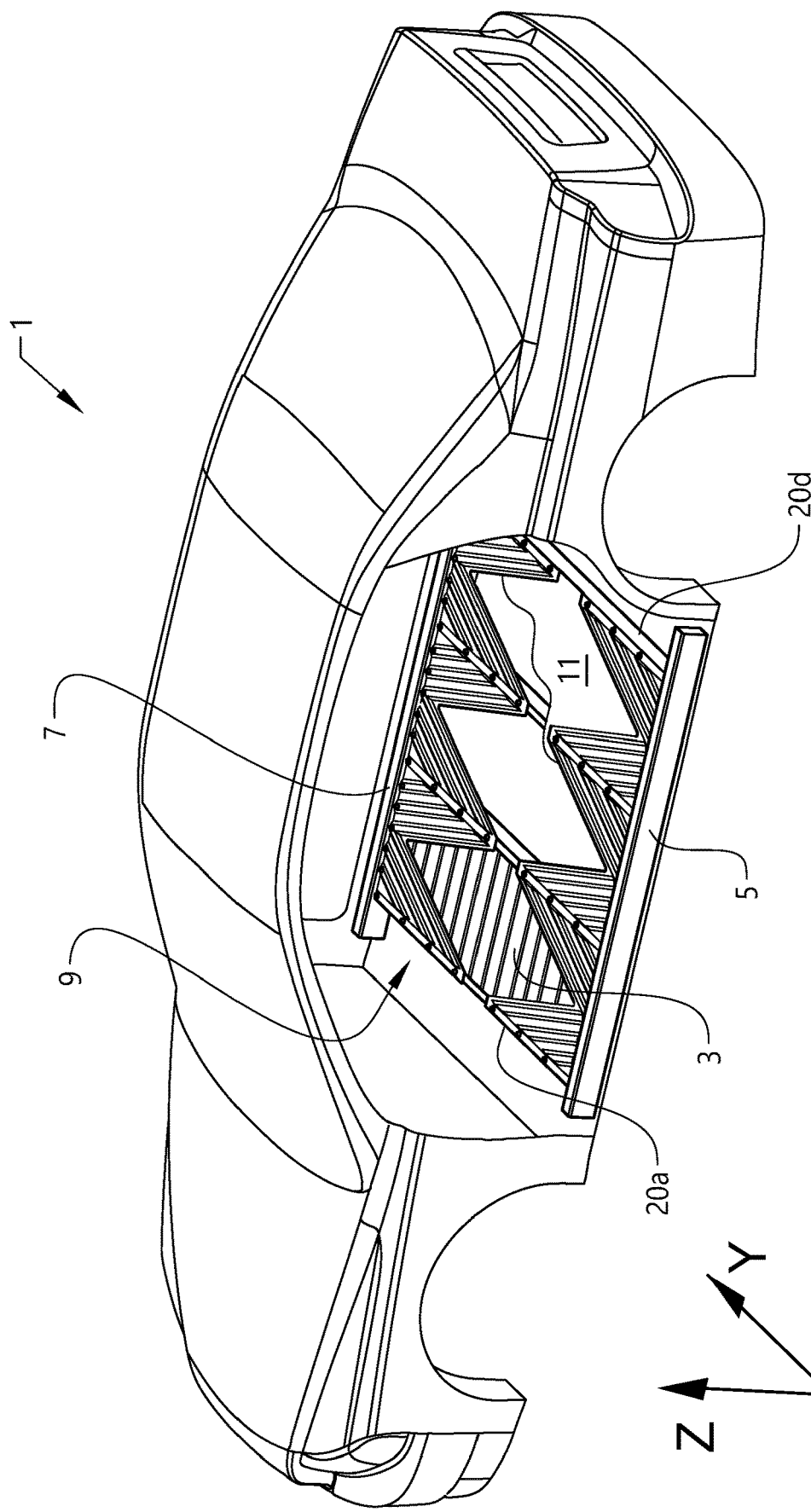
FIG. 1 illustrates a vehicle according to the invention.

FIG. 1 illustrates a vehicle 1, in this case a car, intended for use on public roads. The vehicle 1 extends in a longitudinal direction X, a lateral direction Y and a height direction Z, which directions are perpendicular to each other. The longitudinal direction X is the normal driving direction of the vehicle 1. The lateral direction Y is a cross direction of the vehicle 1.

The vehicle 1 comprises a vehicle power source in the form of a vehicle battery pack 3. The battery pack 3 is located between longitudinal side members 5, 7, also called sill members, which form part of a frame of the vehicle 1. The battery pack 3 comprises a plurality of battery modules and forms part of a vehicle power source arrangement 9.

Figure 2:
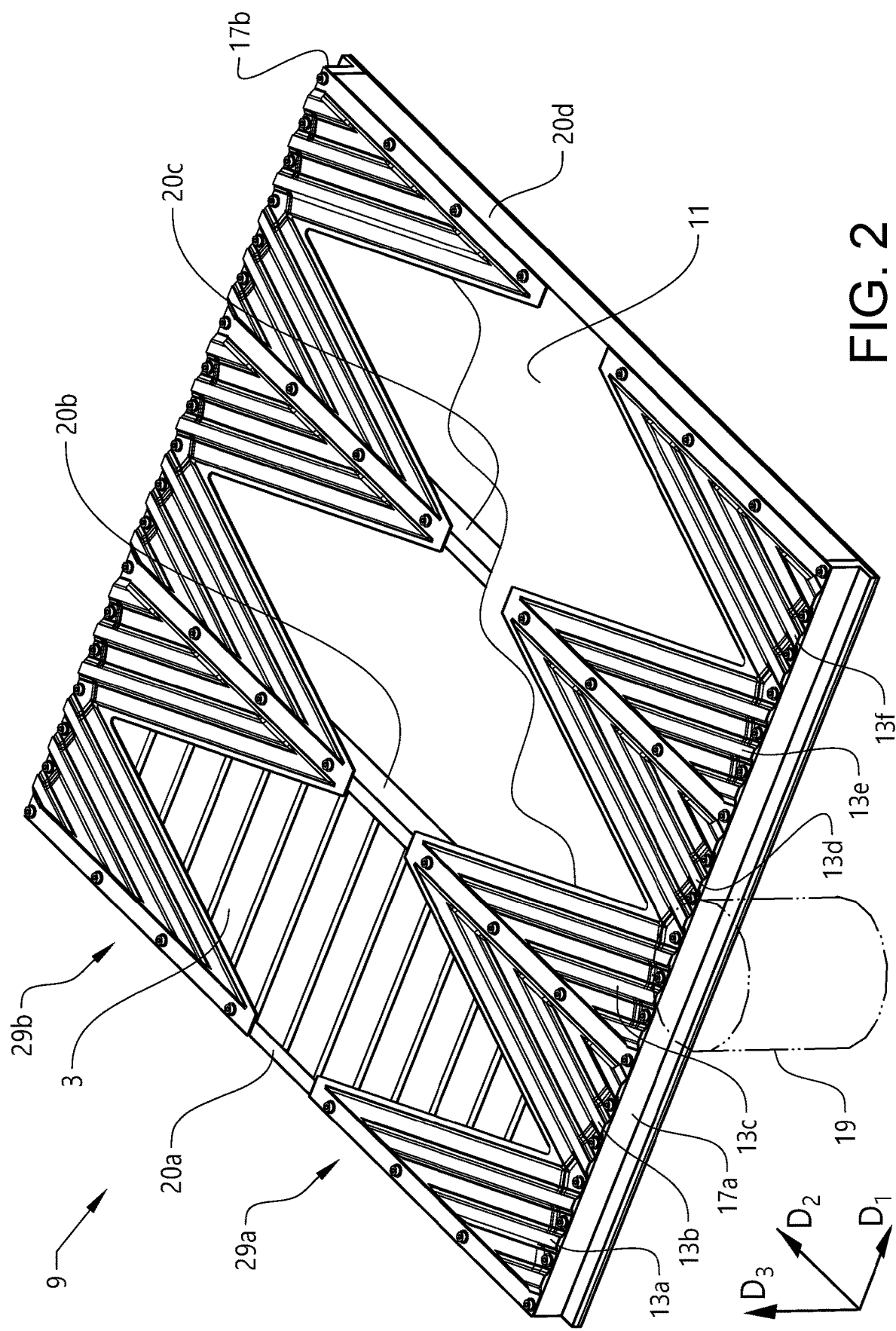
FIG. 2 illustrates a vehicle power source arrangement according to the invention.
Figure 3:
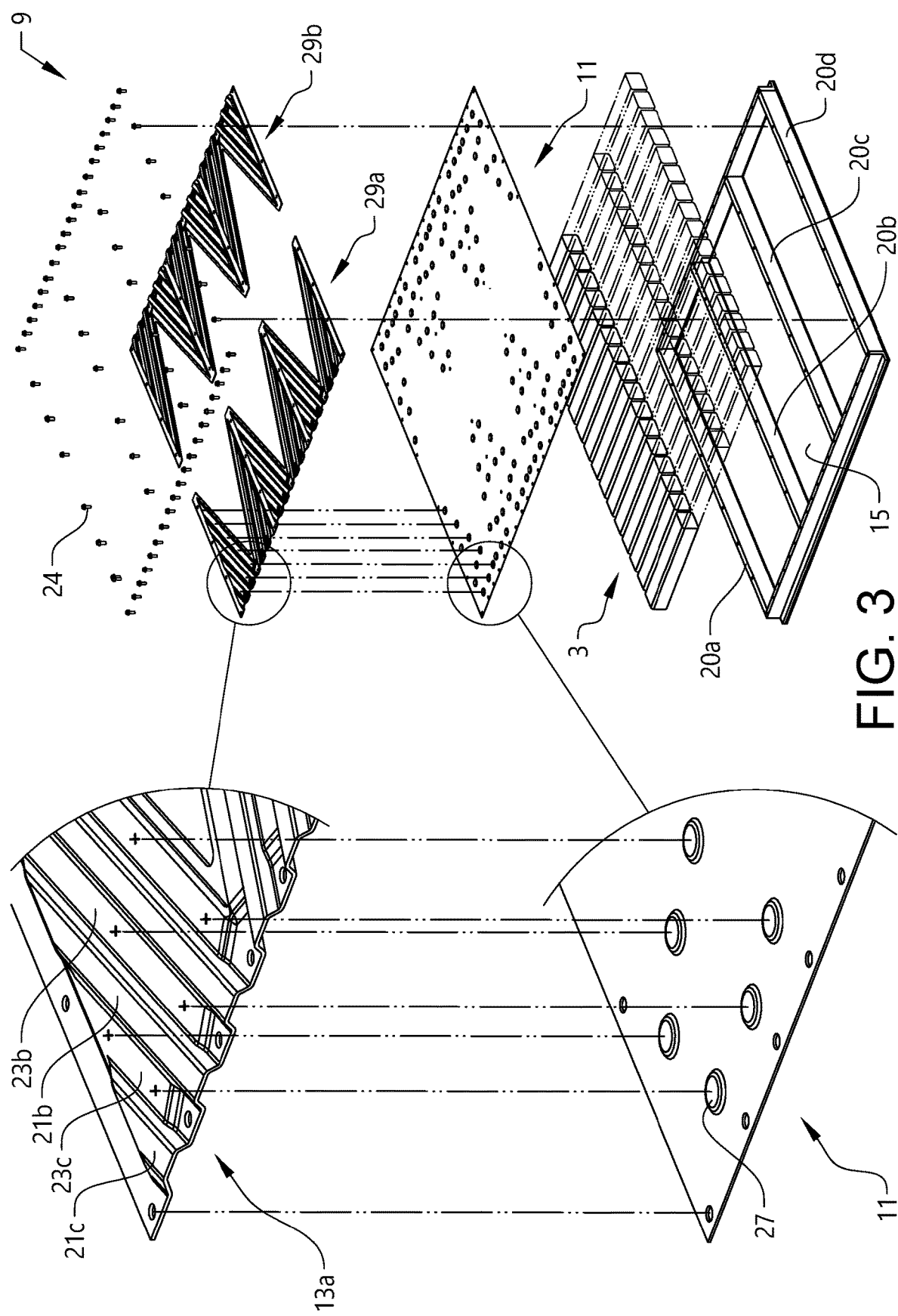
FIG. 3 is an exploded view of the vehicle power source arrangement of FIG. 2.

FIG. 2 is a more detailed view showing the vehicle power source arrangement 9. FIG. 3 shows an exploded view of the vehicle power source arrangement 9.

A top lid 11 is located on top of the battery pack 3, thereby forming a protective cover of the battery pack 3, which cover seals the battery pack 3 from above. On top of the top lid 11, there is provided a plurality of reinforcement structures 13a, 13b, . . . , which preferably are attached to the top lid 11, preferably by spot welding or projection welding. In the illustrated embodiment there are twelve reinforcement structures 13a, 13b, . . . , which are described in more detail below. The top lid 11 preferably has a shaped surface, such that there are protrusions 27 at the locations for the welds. This is also described in more detail in conjunction with FIG. 6.

A first direction $D_1$ of the vehicle power source arrangement 9 and thus also of each of the reinforcement structure 13a, 13b, . . . coincides with the longitudinal direction X of the vehicle 1. A second direction $D_2$ coincides with the lateral direction Y of the vehicle 1. A third direction $D_3$ coincides with the height direction Z of the vehicle 1.

A bottom wall 15 is located below the battery pack 3. There are lateral walls 17a, 17b, located along the lateral sides of the battery pack 3, i.e. extending in the first direction $D_1$. Cross members 20a, 20b, 20c, 20d extend in the lateral direction of the vehicle 1, i.e. in the second direction $D_2$. The battery modules are located in between the cross members 20a, 20b, 20c, 20d, as illustrated in FIG. 3. In FIG. 2 two rows of battery modules and a portion of the top lid 11 are removed to better visualize the structure of the vehicle power source arrangement 9. The bottom wall 15, the top lid 11, the lateral walls 17a, 17b, a front cross member 20a and a rear cross member 20d together form a housing around the battery pack 3.

The reinforcement structures 13a, 13b, . . . are substantially shaped as triangles. They may be arranged in a regular manner, as is illustrated, such that each reinforcement structure 13a, 13b, . . . forms a mirror image of its adjacent reinforcement structure 13a, 13b, . . . . Each reinforcement structure 13a, 13b, . . . is attached to one of the lateral walls 17a, 17b, e.g. by means of and adhesive and/or bolts 24, such as of M8 size, along a first side of the triangle. Further, each reinforcement structure 13a, 13b, . . . is also attached to one of the cross members 20a, 20b, 20c, 20d, e.g. by means of and adhesive and/or bolts 24, such as of M8 size, along a second side of the triangle. A right angle is formed between the first and second sides of the triangle.

As mentioned above, the reinforcement structures pairwise form mirror-images of each other. It has been found beneficial to form a plurality, such as two, three, four, six, eight, or more, reinforcement structures as a common unit from a piece of sheet. In the illustrated embodiment, six reinforcement structures 13a, 13b, 13c, 13d, 13e, 13f, i.e. all reinforcement structures at the same lateral side of the battery pack 3, are formed as a common reinforcement unit 29a, see FIG. 2, and the same for a common reinforcement unit 29b at the other lateral side. It would also be possible to form all reinforcement structures, i.e. at both lateral sides, as a common reinforcement unit.

In FIG. 2, there is further indicated a pole 19, see dashed lines, in order to show a possible side impact scenario. In this example, the pole 19 would hit in between cross members 20b, 20c.

In case of a side impact, e.g. with the pole 19, the reinforcement structures 13a, 13b, . . . are able to redistribute a load being applied to the vehicle 1 from the side of the vehicle 1. See the cross-sectional view of FIG. 4. Load will in this example be redistributed from the lateral wall 17a to the cross members 20a, 20b, 20c, 20d and to the bottom wall 15. There will be load paths, indicated by arrows, below the battery pack 3, i.e. along the bottom wall 15, and above the battery pack 3, i.e. along the top lid 11 reinforced by the reinforcement structures 13b, 13c. This will contribute to preventing the lateral wall 17a from tilting, which is a risk in prior art solutions without the reinforcement structures. As a result, there will be less intrusion in the battery pack 3 due to the side impact as compared to prior art solutions. The influence on the battery pack 3 from the side impact will thus be less.

Figure 4:
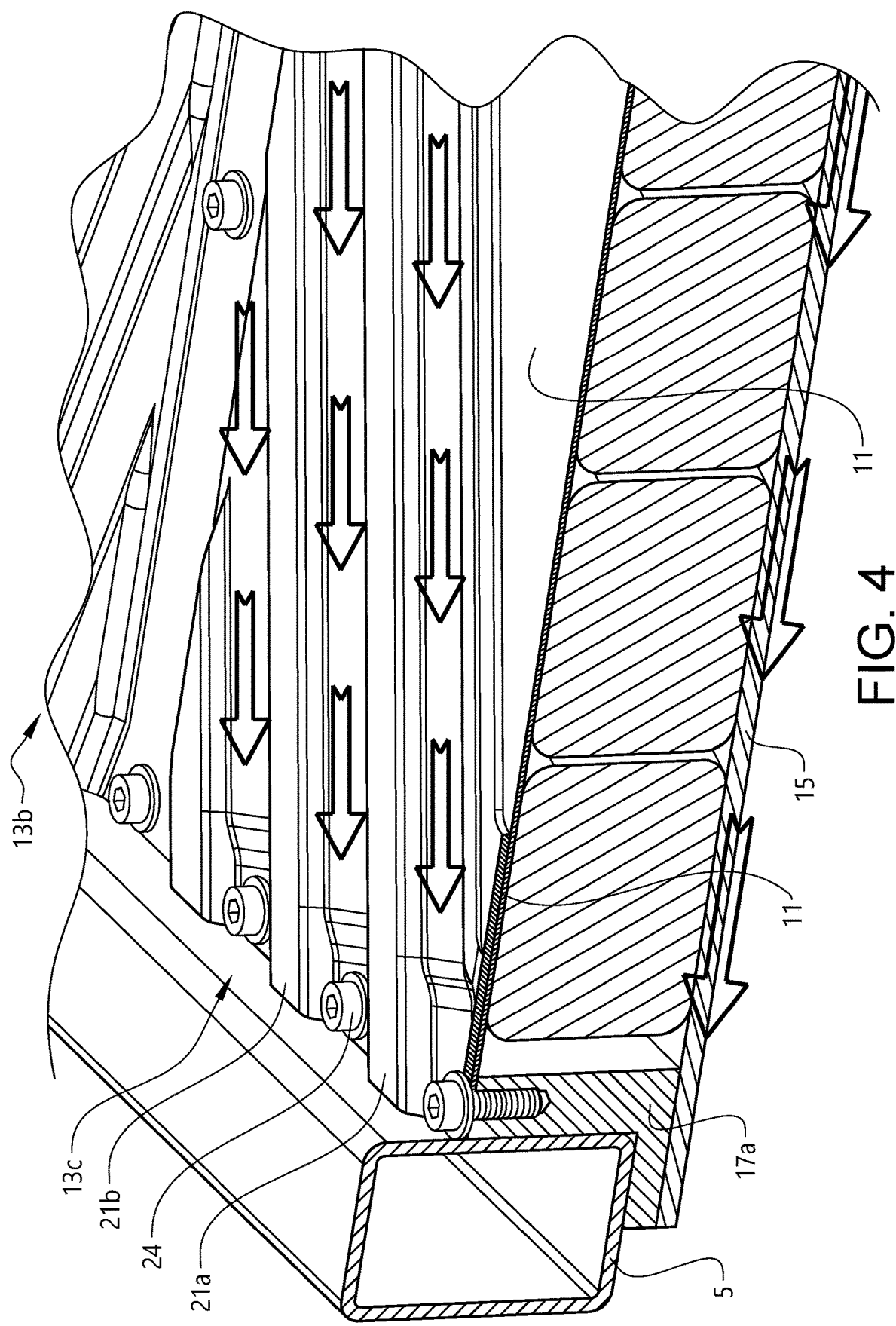
FIG. 4 is a cross-sectional view of the vehicle power source arrangement of FIG. 2.

The longitudinal side member 5, also called the sill member is schematically depicted in FIG. 4. The longitudinal side members 5, 7 are typically made of sheet metal, which has been stamped, pressed or bent to obtain the desired cross-sectional shape.

Also the lateral wall 17a is schematically depicted in FIG. 4. Typically, the lateral walls 17a, 17b and the cross members 20a, 20b, 20c, 20d are extruded, such that their cross-sections comprise internal cells and/or internal walls.

Figure 5:
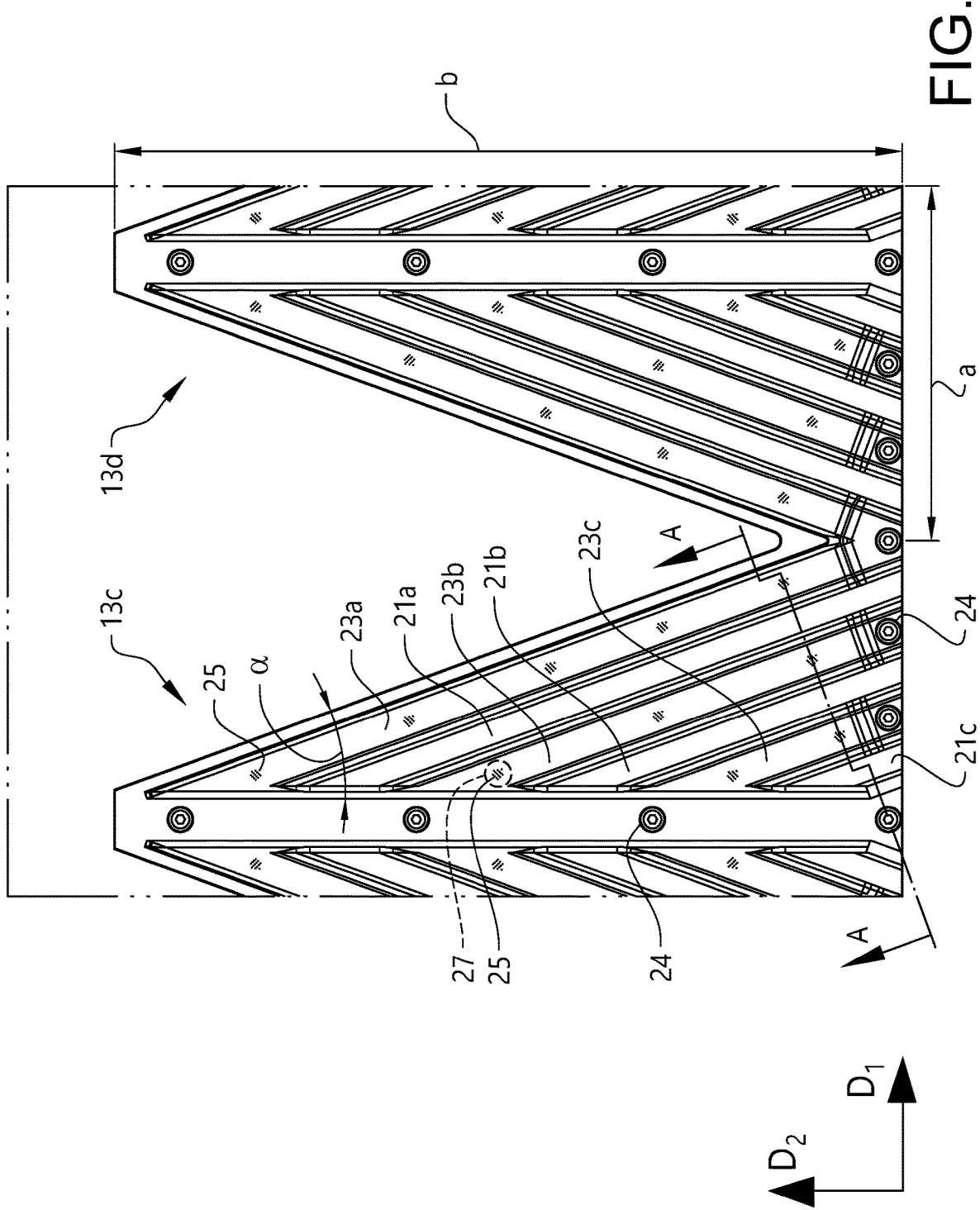
FIG. 5 is a top view of a pair reinforcement structures according to the invention.
Figure 6:
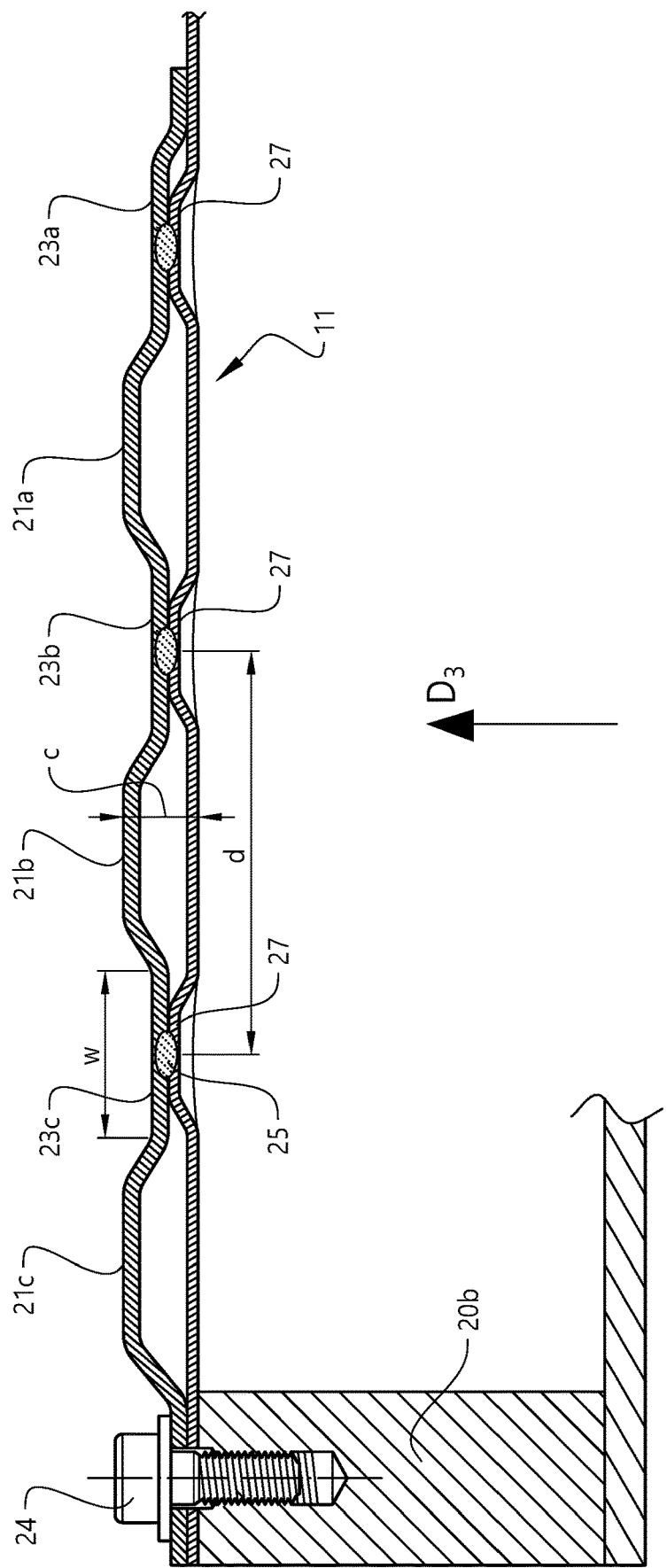
FIG. 6 is a cross-sectional view of one of the reinforcement structures of FIG. 5.

FIG. 5 shows a top view of two of the reinforcement structures 13c, 13d. FIG. 6 shows a cross-sectional view of one of the reinforcement structures 13c along the line A-A in FIG. 5. The same directions are used as for FIG. 2.

As mentioned above, the reinforcement structure 13c is attached to the lateral wall 17a, e.g. by means of bolts 24, along a first side of the triangle extending in the first direction $D_1$. Further, the reinforcement structure 13c is attached to one of the cross members 20b located inside the battery pack 3 by means of bolts 24 as is illustrated, along a second side of the triangle extending in the second direction $D_2$. A right angle is formed between the first and second side of the reinforcement structure 13c.

The reinforcement structure 13c is formed by a sheet metal, which has been provided with ridges 21a, 21b, 21c and intermediate valleys 23a, 23b, 23c by forming depressions in the sheet metal. The ridges 21a, 21b, 21c are preferably equidistant, as is illustrated, and extend in parallel to each other. Correspondingly, the valleys 23a, 23b, 23c are equidistant and extend in parallel to each other. The reinforcement structure 13c has a shape of a right-angled triangle with the ridges 21a, 21b, 21c and valleys 23a, 23b, 23c being parallel to the longest side of the triangle. The top angle α of the triangle is in the range of 5-75 degrees, preferably 10-60 degrees, more preferably 15-50 degrees.

A maximum extension a of the reinforcement structure in the first direction $D_1$, see FIG. 5, is in the range of 5-50 cm, preferably 5-40 cm, more preferably 10-30 cm, most preferably 15-25 cm.

A maximum extension b of the reinforcement structure in the second direction $D_2$, see FIG. 5, is in the range of 20-150 cm, preferably 25-125 cm, more preferably 30-100 cm, most preferably 40-70 cm.

A maximum extension c of the reinforcement structure in the third direction $D_3$, see FIG. 6, is in the range of $0 < c \leq 5$ cm, preferably $0.3 \leq c \leq 3$ cm, more preferably $0.5 \leq c \leq 2$ cm, most preferably $0.8 \leq c \leq 1.5$ cm.

The extension a, b in the first and second directions $D_1$, $D_2$ of the reinforcement structure is at least 5 times larger than the extension c in the third direction $D_3$, preferably at least 10 times larger, more preferably at least 20 times larger.

The valleys 23a, 23b, 23c have a bottom width w in the range of 0.2-10 cm, preferably 0.5-8 cm, more preferably 1-5 cm, most preferably 1-3 cm. The bottoms of the valleys 23a, 23b, 23c are flat in order to be suitable for welding to the top lid 11. The bottom width w may thus be adapted to the size of a welding tool. A number of attachments, indicated as spot welds 25 in FIGS. 3, 5 and 6, may be utilized to attach the reinforcement structure 13c to the top lid 11. As mentioned above, the top lid 11 has a shaped surface, such that there are protrusions 27 at the locations for the welds 25. The protrusions 27 are quite small, e.g. having a diameter less than 20 mm or less than 15 mm. Thereby, the reinforcement structure 13c is in physical contact with the top lid 11 at those protrusions 27 and there is no physical contact, or substantially no physical contact, outside the protrusions 27. This will help to reduce the risk of trapping moisture between the reinforcement structure 13c and the top lid 11, which moisture could risk leading to corrosion.

As an alternative or a complement to the welds, the valleys of the reinforcement structure 13c may be continuously attached to the top lid 11, e.g. by means of an adhesive.

The width w of the valleys 23a, 23b, 23c are determined as the narrowest width. It is thus typically determined in a direction being perpendicular to the extension direction of the valley 23a, 23b, 23c. Also the cross-section illustrated in FIG. 6 is taken in this direction, as is indicated by the dashed line A-A in FIG. 5.

The c-c distance d between two adjacent valleys 23a, 23b, 23c is typically in the range of 0.4-20 cm, preferably 1-16 cm, more preferably 2-10 cm, most preferably 4-8 cm. The distance d is determined as a centre to centre distance between two adjacent valleys 23a, 23b, 23c.

The cross member 20b is schematically depicted in FIG. 4. Typically, the cross members 20a, 20b, 20c, 20d are extruded, such that their cross-sections comprise internal cells and/or internal walls.

Although the illustrated embodiments show that the reinforcement structures 13a, 13b, 13c, 13d, 13e, 13f reinforce the top lid 11, there may as alternative or a complement be other reinforcement structures according to the invention reinforcing the bottom wall. They may then be attached to the bottom wall 16 in a corresponding way as already described for the top lid 11. The reinforcement structures may then be located either on an upper side or a lower side of the bottom wall 16.

As an alternative or a complement to the illustrated shaped sheet metal of FIGS. 1-6, the reinforcement structure may comprise, or be constituted by at least one strut extending between one of the cross members 20a, 20b, 20c, 20d and one of the lateral walls 17a, 17b, preferably a plurality of struts extending between the cross member and the lateral wall, more preferably the struts extending in parallel between the cross member and the lateral wall. In that case the struts and their interspaces would correspond to the ridges and valleys of the illustrated embodiment. The struts themselves could in that case be attached to the top lid. There may be from 1 to 10 struts, preferably from 2 to 8, more preferably from 2 to 5, most preferably from 2 to 4, e.g. extending in parallel.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A reinforcement structure for protection of a vehicle power source, said reinforcement structure comprising a reinforcement structure extending in first, second and third directions (D1, D2, D3), said first, second and third directions (D1, D2, D3) being perpendicular to each other, wherein an extension of said reinforcement structure is at least 5 times larger in said first and second directions (D1, D2) than in said third direction (D3), and wherein said reinforcement structure has a tapered shape as seen in a plane spanned by said first and second directions (D1, D2), wherein said reinforcement structure comprises a shaped sheet metal, which comprises a plurality of ridges interspaced by valleys extending in parallel.

2. The reinforcement structure according to claim 1, wherein said tapered shape, as seen in said plane spanned by said first and second directions (D1, D2), is continuously decreasing, preferably regularly continuously decreasing, more preferably triangular, most preferably having a shape of a right-angled triangle.

3. The reinforcement structure according to claim 1, wherein a maximum extension (a) of said reinforcement structure in said first direction (D1) is in the range of 5-50 cm, preferably 5-40 cm, more preferably 10-30 cm, most preferably 15-25 cm.

4. The reinforcement structure according to claim 1, wherein a maximum extension (b) of said reinforcement structure in said second direction (D2) is in the range of 20-150 cm, preferably 25-125 cm, more preferably 30-100 cm, most preferably 40-70 cm.

5. The reinforcement structure according to claim 1, wherein a maximum extension (c) of said reinforcement structure in said third direction (D3) is in the range of $0<c\leq5$ cm, preferably $0.3\leq c\leq3$ cm, more preferably $0.5\leq c\leq2$ cm, most preferably $0.8\leq c\leq1.5$ cm.

6. The reinforcement structure according to claim 1, wherein said valleys have a bottom width (w) in the range of 0.2-10 cm, preferably 0.5-8 cm, more preferably 1-5 cm, most preferably 1-3 cm.

7. The reinforcement structure according to claim 1, wherein a c-c distance (d) between two adjacent valleys is in the range of 0.4-20 cm, preferably 1-16 cm, more preferably 2-10 cm, most preferably 4-8 cm.

8. A reinforcement unit comprising a plurality of reinforcement structures according to claim 1, preferably said plurality of reinforcement structures being arranged such that a first reinforcement structure forms a mirror image of an adjacent second reinforcement structure, as seen in said plane spanned by said first and second directions (D1, D2).

9. A vehicle power source arrangement comprising:
a vehicle power source, e.g. a battery pack or a fuel cell, and
at least one of said reinforcement structures according to claim 1, preferably a plurality of said reinforcement structures.

10. The vehicle power source arrangement according to claim 9 further comprising a top lid configured to cover said vehicle power source, said at least one reinforcement structure being located at said top lid, preferably being attached to said top lid, e.g. by means of spot welding or projection welding.

11. The vehicle power source arrangement according to claim 10, wherein said top lid comprises a number of protrusions, preferably located at the locations where said reinforcement structure is attached to said top lid.

12. The vehicle power source arrangement according to claim 9 further comprising a bottom wall configured to carry said vehicle power source, said at least one reinforcement structure being located at said bottom wall, preferably being attached to said bottom wall, e.g. by means of spot welding or projection welding.

13. The vehicle power source arrangement according to claim 12, wherein said bottom wall comprises a number of protrusions, preferably located at the locations where said reinforcement structure is attached to said bottom wall.

14. The vehicle power source arrangement according to claim 9, wherein said vehicle power source arrangement comprises at least one lateral wall extending along a lateral side of said vehicle power source and at least one cross member extending across said vehicle power source or along a front side or a rear side thereof, wherein said reinforcement structure comprises at least one strut extending between said cross member and said lateral wall, preferably a plurality of struts, more preferably said struts extending in parallel.

15. A vehicle comprising the reinforcement structure of claim 1.

* * * * *